Aug. 22, 1967     L. W. TWOHEY     3,336,798
STORM WARNING DEVICE
Filed Aug. 13, 1964     2 Sheets-Sheet 1
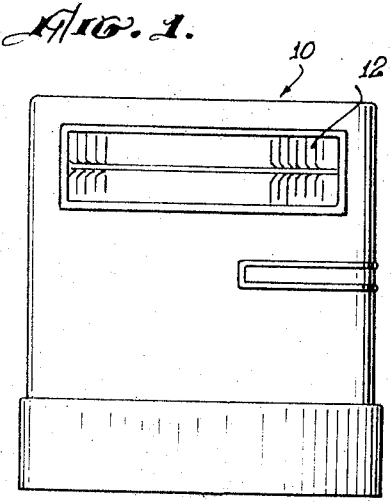
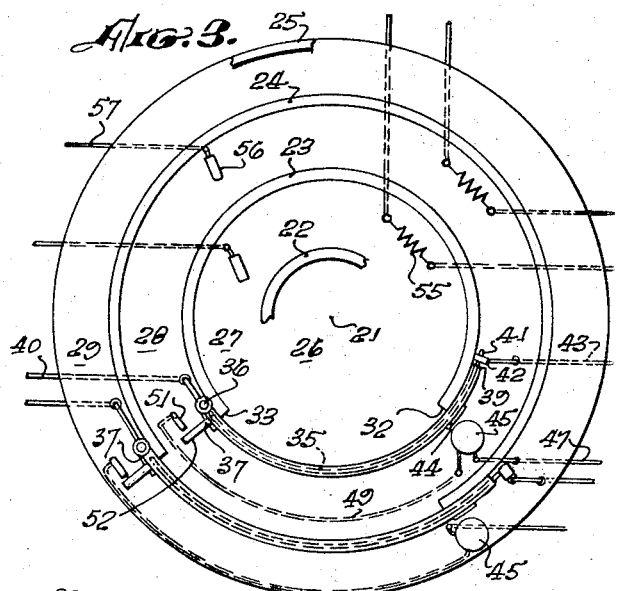
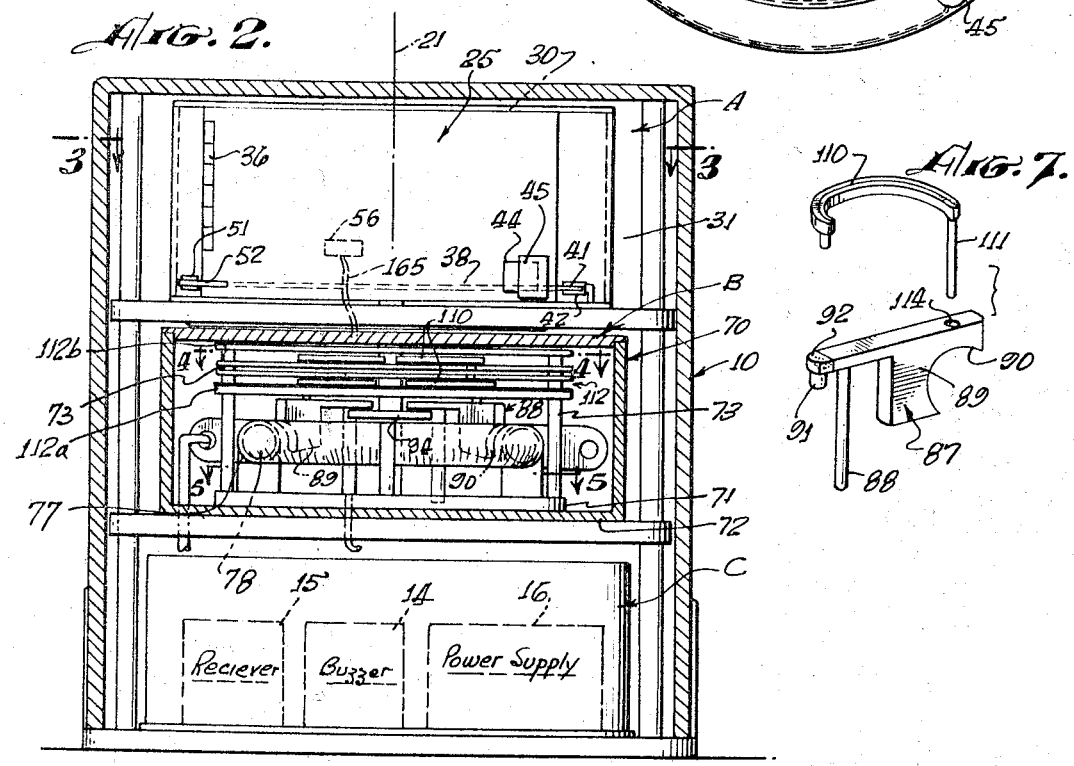
LEWIS WEST TWOHEY,
INVENTOR.
BY HIS ATTORNEYS.
Spensley & Horn

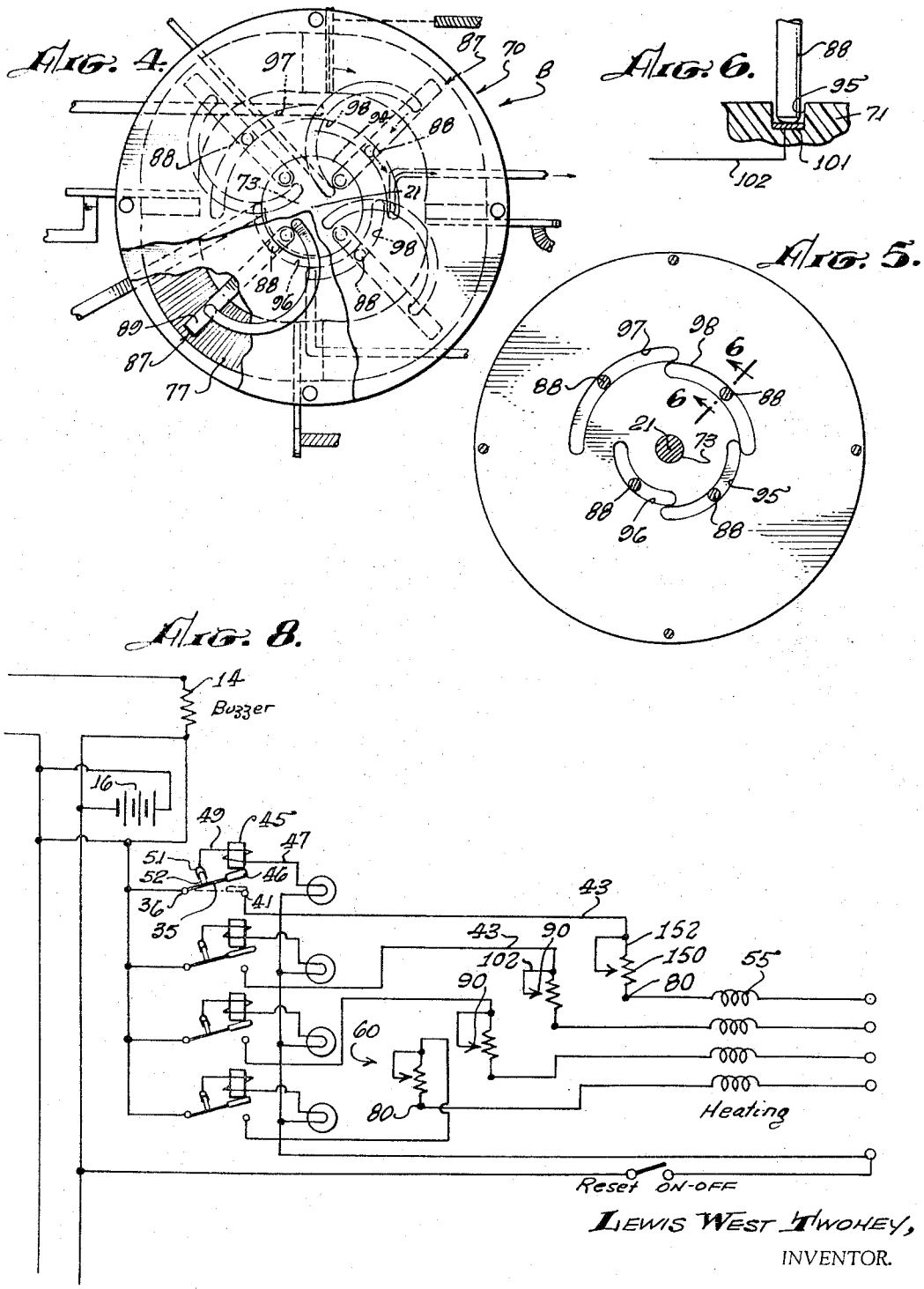

United States Patent Office 3,336,798
Patented Aug. 22, 1967

3,336,798
STORM WARNING DEVICE
Lewis West Twohey, 2338 Cheryl Place,
Los Angeles, Calif. 90049
Filed Aug. 13, 1964, Ser. No. 389,420
6 Claims. (Cl. 73—170)

This invention relates to a warning device and more particularly to a self-contained storm warning device or alarm for indicating the approach of a storm which is capable of causing a drop in barometric pressure.

The first indication of changes in the weather is a variation of pressure over a specific area due to moving pressure areas called "fronts." These fronts are usually formed near the polar caps and on the equator. The weather fronts usually produce a change of weather within about a twenty-four-hour period. In the case of storm systems developed as a result of these fronts a secondary system of storms may often develop characterized by rain and thunder storms which may give rise to tornadoes and associated storms of this type. Storms such as tornadoes usually occur in a localized small geographical area and residents in the paths of these storms are often not forewarned of these storms and cannot therefore take the necessary safety precautions to avert the damage caused by the storm. Often sufficient pressure gradient data is provided such that precautions may be taken against loss of life and in some cases property. Often this condition or sub-condition may occur during the evening hours so that total dissemination of the information is not possible. Additionally, however, due to the localized nature of such storms a general weather forecast may not be sufficient to advise residents of a given area of the approach of a highly localized storm such as a tornado. At times such as this communities and cities sustain large losses of property and life.

Other types of storms such as hurricanes are usually predicted far in advance of their actual arrival upon the mainland and afford ample opportunities to take precautions agianst losses. Nevertheless, there are numerous recorded examples of heavy loss of life and property in fringe areas due to unpredictable deviations in the path of this storm. In such instances an individual storm warning device is desirable.

Several devices for indicating the approach of storms have been developed in the prior art; however, such devices have several disadvantages. In these prior devices, the approach of a tornado has been determined by the use of barometric pressure sensing means when the barometric pressure drops to a predetermined value. As a result these alarms can be set off by normal changes in barometric pressure when these changes are of sufficient amplitude although the pressure change has occurred over a relatively long period of time, thus a false storm warning results.

Another undesirable feature of warning devices using barometric pressure sensing means is that each device must be adjusted with respect to the altitude of the location in which the device is placed; this is often not possible without seeking the assistance of trained technicians and the efficiency and adjustment of the devices is suspect.

Accordingly, it is an object of this invention to provide a storm warning device which will not emit a warning under normal ambient pressure variations.

Still another object of the present invention is to provide a storm warning device that gives a warning based on the approximate rate of change in barometric pressure.

Yet another object of this invention is to provide a storm warning device that operates independently of the altitude at which it is installed.

Another object of the present invention is to provide a storm warning device that has greater sensitivity than devices using barometric pressure sensing means.

A further object of the present invention is to provide a storm warning device in which a sequential warning can be given of continuing drops in barometric pressure.

The present invention is a self contained storm warning device which emits a series of sequential signals upon continuing drops in barometric pressure. The present invention includes a plurality of closed chambers having doors associated therewith that will open at a given pressure differential between the interior of the chamber and the exterior thereof, where the exterior is at ambient pressure. Means are provided for maintaining the plurailty of chambers at a predetermined interior pressure. The door of each chamber is so constructed and arranged that it will open at a predetermined pressure differential and upon opening a signal is emitted.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

In the drawing:

FIGURE 1 is a view and elevation of the presently preferred embodiment of a storm warning device in accordance with the present invention;

FIGURE 2 is a cross sectional view in elevation of the presently preferred embodiment of the present invention;

FIGURE 3 is a partially schematic sectional view taken along line 3—3 of FIGURE 2;

FIGURE 4 is a sectional view taken along line 4—4 of FIGURE 2;

FIGURE 5 is a sectional view taken along line 5—5 of FIGURE 2;

FIGURE 6 is a partial view taken along line 6—6 of FIGURE 5;

FIGURE 7 is an exploded view in perspective of the variable resistance arm and bi-metallic strip used in connection with each gate;

FIGURE 8 is a circuit diagram of the electrical circuitry employed in the presently preferred embodiment of a storm warning device in accordance with the present invention.

Referring now to the drawing, the present invention in its presently preferred embodiment comprises a housing 10 as shown in FIGURE 1 which is formed of plastic or other suitable structural material. An opening such as shown at 12 is provided through the housing to allow communication of the interior of the housing to the ambient external pressure and atmospheric conditions. In general the device, as shown in FIGURE 2, includes a pressure sensing section A, a heat regulating section B, and an auxiliary section C. Within the auxiliary section there is provided the power supply such as a battery, a buzzer or other suitable audible warning signal device, and a receiver 15 which may be a radio receiver tuned to a civil defense frequency, or the like, for receiving a signal which can be operatively connected to the apparatus to indicate the receipt of a civil defense warning signal. The receiver 15, buzzer or audible signal device 14, and power supply 16, are all of the type well known to the art.

In general, the pressure sensing section A of the apparatus of the present invention is a cylinder which is separated into a plurality of annular chambers each separated from the other by a spring loaded gate formed to close a mating opening defined by a wall of the chamber. In the presently preferred embodiment four such annular chambers are utilized. The interior of the chambers is heated to provide a large pressure differential between the interior of each chamber and the ambient air conditions. As the ambient pressure drops the loading on the gate is increased until the pressure differential reaches the design load of the gate caused by the force of the spring, or the like, and frictional contacts at which point the gate opens to close a warning circuit. The warning circuit can, for example, light an indicating light and sound an audible signal. The point at which the gate opens is determined by the spring pressure, area of the door, and frictional forces involved, and is such that it will open to complete the circuits upon a predetermined pressure differential existing between the internal pressure of the chamber with which the gate is associated and the ambient air pressure. Upon opening, the gate is held open by suitable means such as an electro-magnet which at the same time discontinues the heating of the corresponding annular chamber and allows ambient conditions to exist within the chamber. In the presently preferred embodiments the annular chambers and corresponding pressure differential gates are so constructed and arranged that each of the four is opened in sequence with the first gate, i.e., the gate with the largest diameter being opened by the smallest pressure differential and each of the inwardly succeeding gates being opened as the pressure differential increases. In the embodiment, shown as the gates open the outermost gate causes an indicating light to be lit, the second gate to be opened causes a second indicating light to be lit, similarly the third gate causes a third sequential indicating light to be lit, and upon the opening of the fourth gate a dominant indicating light is lit and a buzzer is sounded to indicate the near approach of a storm corresponding to a large differential existing between the internal pressure of the device and the ambient air pressure. As the storm conditions pass the chambers can be returned to normal conditions by a reset switch. The battery 16 is shown as part of a completely self contained device not dependent upon a source of household current. It is to be understood that the device can be adapted to use household current supply or can be adapted to use a rechargeable battery or completely self contained battery, all as well known to the art. The radio receiver 15 shown in the auxiliary section C of the apparatus is of the type which is selective to a small number of frequencies which are designated as civil defense frequencies, such that if a signal is received warning of a local occurrence other than a storm the receiver is connected to a warning buzzer to sound the buzzer upon receipt of a predetermined signal.

In general and as discussed more fully hereinafter the heat regulating section B of the device of the present invention is a means for automatically regulating the heating requirements of an electric current heater positioned within each of the plurality of annuluses to maintain the temperature within the annulus at a predetermined point. The temperature to which the interior of the annulus is heated and maintained is dependent upon the location at which the device is to be utilized but is in general at a temperature above that likely to be encountered in the ambient. The purpose of maintaining the annulus at a temperature above ambient is to maintain the pressure of the air within the annulus at a constant point well above the pressure which will exist in the ambient. In order to maintain each annulus at a predetermined temperature a sliding contact is moved over a wire wound resistor with a contact point touching a plate which carries the output. The contact on the resistor is controlled by a bi-metallic strip connected to the control chamber.

The input current to the chamber is controlled by the position of the contact on the resistor which is set by the position of the bi-metallic strip. This strip is designed to have a specific diameter according to the sustained temperature in the chamber. If the temperature drops the strip contracts increasing the current while if the temperature increases the strip expands and decreases the current.

Referring now to FIGURES 2 and 3 the pressure sensing section A of the device is shown in detail. In FIGURE 3 only two annular chambers and their corresponding gates are shown in detail, it being understood that each of the annular chambers is similar in construction except for the area of the gate. The detailed description hereinafter applies equally well to each gate and chamber wall in the plurality. In the presently preferred embodiment four annular chambers are shown, it being understood that any number can be utilized. Thus, as shown particularly in FIGURE 3 a series of concentric cylindrical walls are coaxially arranged with respect to a vertical centerline 21 through the apparatus. The cylindrical walls are typically formed of plastic such as styrene or nylon. The cylindrical walls designated as 22, 23, 24 and 25 are radially spaced outwardly from the centerline 21 to define annular chambers 26, 27, 28 and 29 respectively. A top cover 30 and a bottom cover 31 extend across the upper and lower edges of the cylindrical walls to enclose the annular chambers and seal them from the ambient. Each of the cylindrical walls are sealed to the upper and lower cover plates to provide the sealed annular chambers 26 through 29. In each of the cylindrical walls there is provided an arcuate opening as defined by the edges 32 and 33 of the cylindrical wall 23 in FIGURE 3. The arcuate length of the opening through each wall varies such that the area of the outermost opening, i.e., through cylindrical wall 25, is much greater than the opening through the cylindrical wall 22. Thus, the area of each opening decreases from the outermost cylindrical wall inwardly and the corresponding area of the gate correspondingly decreases. The gate construction is shown in detail only in connection with the cylindrical wall 23 and 24, the remainder being similar in construction. In connection with the cylindrical wall 23 as described hereinabove the arcuate opening is defined by the vertical edges 32 and 33. The pressure gate designated generally 35 is arcuate in configuration and at least equal to the height to the cylindrical wall such that it completely covers the arcuate opening defined through the cylindrical wall 23. The gate 35 is hinged upon a pivot post 36 and is spring loaded by a torque spring which urges it radially inwardly, i.e., toward the centerline 21 of the apparatus. The spring is shown generally at 37 in FIGURE 3. The gate 35 is formed of electrically insulating material such as molded plastic which may be styrene, nylon or the like. The post 36 is insulated from the door but a conducting wire shown as 38 in FIGURES 2 and 3 is molded within the door and extends from the pivoted edge to the opposite edge 39 thereof. The wire extends from the door and is electrically connected to an electrical connector wire 40 which is in turn connected to one side of the power supply 16. The wire 38 is electrically connected at the opposite edge of the door to a friction contact such as the blade portion of a blade and socket contact. At the end of the gate opposed to the pivoted end the blade connector 41 is electrically connected to the wire 38 and when in the closed position is in electrical contact with the socket portion 42 of the blade contact connector. That is, the blade and socket connector is of the type well known to the art wherein a knife like member is clamped between opposed contact plates. The electrical connector wire 43 is in turn connected to the socket of the blade and socket contact such that when the door is in the closed position an electrical circuit exists from the connector 40 through the wire 38, blade 41, socket 42 and outward through the connector 43. At the exterior surface of the gate 35 there is provided a plate of magnetizable material 44 which is affixed within the insulating door at a point opposite an electro-magnet coil 45 positioned within the annulus. The electro-magnet coil 45 and plate 44 are so located that when the door is moved to the open position the plate and coil make contact. If current is then present in the electro-magnet coil 45 the door will be held in the open position. To provide the current in the coil a connector 47 is connected to one side of the electro-magnet and an electrical connector 49 is connected from the other side of the electro-magnet to the socket portion 51 of a blade and socket connector similar to that previously described. The blade portion 52 of the blade and socket connector is affixed to the door such that when the door is in the closed position the blade 52 and socket 51 are not in electrical contact. When the door moves into the open position the blade 52 makes contact with the socket 51 and electrical continuity exists from the connector 40 to the power supply hrough the blade 52, socket 51, connector wire 49 and to the electro-magnet 45 which is now energized and maintains the plate 44 in magnetized contact therewith. Thus, when the gate 35 is moved outwardly magnet attraction maintains the door in the open position. At the same time the electrical continuity through the connector wire 43 is broken and the heating coil within the annular chamber 27 is discontinued as described more fully, hereinafter.

Within each annular chamber there is provided a heating coil 55 and a temperature probe 56. The temperature probe 56 is a bi-metallic probe formed of the same bi-metallic material as the temperature regulating strip described hereinafter. The temperature probe 56 detects the temperature within the chamber and conducts the temperature through a heat conducting lead 57 to the bi-metallic strip in the temperature regulating chamber B of the device. The resistance heating coil 55 in each annular chamber is the type well known to the art and the temperature thereof is regulated by response of the temperature regulating portion B of the apparatus to the temperature probe 56 positioned within the annular chamber. Thus, referring now to FIGURE 8 the wire 38 through the door is indicated between the point 36 representing the pivot point of the gate 35 and the point 41 representing the blade contact which is within socket 42 when the door is in the closed position. The circuit exists from the power supply 16 through the lead 40 and the wire 38 and through the lead 43 to the variable resistance shown generally as 60 in FIGURE 8. The variable resistance 60 controls the amount of current passing to the heating coil 55 which is located within the annular chamber. Thus, if the temperature at which it is desired to maintain the annular chamber drops the drop in temperature is detected by the temperature probe 56 and the current to the resistance heating coil 55 must be increased. Correspondingly if the temperature within the annular chamber increases above the predetermined desired temperature the current to the heating coil must be decreased. Referring now to FIGURES 2, 3, 7 and 8 the means for varying the current to the heating coil in accordance with the present invention is shown. In the temperature regulating portion B of the apparatus an interior housing 70 of molded plastic or like material having low thermal conductivity is provided and encloses the functioning parts of the temperature regulating apparatus. As shown particularly in FIGURE 2 a bottom plate 71 is positioned upon the lower plate 72 of the interior housing 70 and a plurality of support posts 73 are extended upward from the bottom plate 71. Within the housing there is provided a wound coil 77 which is wound upon a core 78 of an electrically insulating material. The coil is wound in four isolated sections, one corresponding to each of the annular chambers to be controlled. For reasons which will become more apparent hereinafter the insulating core 78 is not circular in configuration but is rather comprised of four arcuate segments each having a radius equal to the radius of the variable contractor which is pivoted to respond to the expansion or contraction of a bi-metallic strip as will be described hereinafter. Thus, a power input connection 80 is made to each of the coil segments and the output is through the coil contactor as shown in the circuit diagram of FIGURE 8. Each of the coil contactors 87 is similar in construction to the one being shown in detail in FIGURE 7 together with its associated bi-metallic strip. The contactor 87 includes a post 88 of electrically conducting material with an arcuate face 90 which is adapted to move in electrical contact across the length of the coil segment 77 with which it is associated. The contactor 87 is pivoted by means of a pivot post 91 which is electrically insulated from the body 89 by means of an insulating pad 92. The post 91 is pivotally affixed to a pivot plate 94 attached to the support posts 73. As shown particularly in FIGURES 5 and 6 the conducting post 88 rides within a groove 95 defined in the bottom plate 71 of the temperature regulating section. The bottom groove is shown particularly in FIGURE 5 and it can be seen that each of the grooves is arcuate in extent with the radius determined by the pivot point of the post 91 and the distance of the contact post 88 from the pivot post. In FIGURE 5 it can be seen that each of the arcuate tracks designated as 95, 96, 97 and 98 and are at varying radii relative to the centerline 21 of the apparatus. This is so in order that each of the tracks may be insulated one from the other electrically. At the bottom of each track an electrical conductor plate 101 is positioned such that the conducting post 88 of the contactor is in sliding electrical connection therewith. An electrical connection is made to the conductor strip 101 by means of lead wire 102 to conduct current from the conducting post 88 through the conducting strip 101, through the lead 102 to one terminal of the variable resistance coil 77. The lead wire 43 from the door is also connected to this terminal such that the current conducted to the heating coil 55 is varied depend upon the position of the contactor 87 with the variable resistance coil 77.

A bi-metallic strip 110 associated with each contactor 87 is affixed at one end thereof by means of a post 111 pivoted in a deck plate 112 of electrically insulating material. Two deck plates 112a and 112b are utilized with two opposed strips on each deck to prevent mechanical interference. The bi-metallic strip is of predetermined material which will increase or decrease its curvature with a temperature change above or below the predetermined temperature desired in the annular chamber which is transmitted to the bi-metallic strip through the temperature probe 56. Connecting post 111 of electrically insulating material extends downwardly through grooves provided in the decks interposed between the upper surface of the contactor body 89 and the bi-metallic strip. The connector post 111 fits within a mating recess 114 provided in the upper surface of the contactor such that changes in the diameter of the bi-metallic strip cause the contactor to be pivoted about its pivot point 91 and to change its position relative to the variable resistance coil 77 with which it is associated. Thus, variation in temperature which is conducted through the bi-metallic strip varies the current conducted to the heating coil which is associated with the annular chamber corresponding to the contactor strip and temperature probe. Operation of the system may be readily understood by reference to the figures of the drawing and particularly the schematic drawing of FIGURE 8. Section 90 of each of the contactors 87 is in constant bearing contact with coil 77 and is thereby making electrical contact with coil 77. As described hereinabove, coil 77 is divided into equal segments, 150, which are insulated from each other. Electrical contact is made through contactor body 89 and through post 88 to plate or strip 101 and then through wire 102 to one end 152 of segment 150. The other end 80 of segment 150 is connected to one end of heating coil 55. Thus, it is readily observed that each segment 150 is electrically arranged as a rheostat with section 90 of contactor 89 acting as the rheostat wiper element.

As described hereinabove, the movement of section 90 will accordingly vary the current through heating coils 55 and thus vary the temperature within the annular chambers. The value of the resistance of each of the segments 150 is chosen according to conventional electrical and heat analysis methods so that when wiper 90 is midway between the ends 152 and 80 of segment 150, the current through heating coil 55 will be adjusted to maintain the desired predetermined temperature in the annular chamber. As described hereinabove, as the temperature of any closed annular chamber changes, the temperature probe 56 senses the change by merely being present in the annular chamber and transmits the new temperature level indicator by heat conduction through flexible metal lead 165 to bi-metallic strip 110. This causes bi-metallic strip 110 to expand or contract, depending respectively on whether the temperature sensed by probe 56 is increasing or decreasing. As a result of the movement of strip 110, the wiper 90 will change its position on segment 150. That is if the temperature in the annular chamber is increased, then the wiper 90 will move from the midpoint of segment 150 closer to the end 152 of the segment 150 so that the resistance 60 is increased and the current through the coil 55 will be decreased so that the temperature of the annular chamber will return to the predetermined steady state condition. In the same manner, if the temperature of the annular chamber decreases, the wiper 90 will move closer to end 80 of segment 150 and thus decrease resistance 60 so that the current in coil 55 will be increased and raise the temperature of the annular chamber.

The bi-metallic strip, variable resistor, heating coil and contactor are all interdependent and are predetermined such that they will maintain the temperature within the annulus at a predetermined level. For most applications a temperature level of approximately 105° F. is desirable. This raises the temperature within the annular chamber to a sufficient pressure that the gate 35 associated with the chamber will not open against the force of the spring 37 maintaining it in the closed position together with the friction involved in the blade and socket contact 41 for that door except when a predetermined pressure differential of considerable extent exists between the interior and exterior of the annulus.

Thus, in operation the outermost gate 35 in the annular chamber 29 is of greatest area. The pressure maintained internally in all of the annular chambers is equal. When a pressure drop occurs in the ambient sufficient to cause the outermost door to be swung to the open position the heating coil for that annular chamber is disconnected and an alarm light is lit by contact of the connectors 52 and 51 as described hereinbefore. The annular chamber 29 then settles to ambient conditions. If a further drop in ambient pressure occurs such that a still greater pressure differential exists between the interior of the annular chamber 28 and the ambient the second gate will open and an alarm light will be lit. Similarly when a still greater differential exists the third gate will be open and so forth until the last gate is opened and an audible or final warning is sounded.

What is claimed is:
1. A storm warning device comprising:
 a housing;
 a plurality of concentrically arranged annular chambers defined by walls within said housing;
 means for maintaining the interior of said chambers at a predetermined pressure greater than ambient;
 means for exposing the exterior of said chambers to ambient pressure;
 a pivotable door in a wall of each of said chambers, each said door having a different surface area and being responsive to varying pressure differentials, said pressure differentials being between the interior and exterior pressure of said chamber; and
 signal means actuated by opening of each said door to indicate said predetermined pressure differential.

2. A storm warning device as claimed in claim 1, wherein said means for maintaining the interior of said chambers at a predetermined pressure comprises:
 a heating coil;
 a resistance element adapted to have its resistance varied;
 means for varying the resistance of said resistance element dependent upon temperature; and
 said resistance element being connected electrically operatively to said heating coil.

3. A storm warning device as claimed in claim 2, wherein said means for varying the resistance of said resistance element comprises:
 wiper means for traversing said resistance element;
 a bi-metallic strip; and
 said wiper means being operatively connected to said strip.

4. A storm warning device comprising:
 a housing;
 a plurality of concentrically arranged annular chambers defined by walls within said housing;
 means for maintaining the interior of said chambers at a predetermined pressure greater than ambient;
 means for exposing the exterior of said chambers to ambient pressure;
 a pivotable door in a wall of each of said chambers, each said door having a different surface area such that each said door is responsive to different pressure differentials, said pressure differentials being between the interior and exterior pressure of said chamber;
 each of said doors having a different surface area and said doors opening sequentially in response to increasing pressure differentials, the door having the largest surface area opening first in response to the smallest pressure differential and the door having the smallest surface area opening last in response to the largest pressure differential; and
 signal means actuated by opening of each said door to indicate said predetermined pressure differentials.

5. A storm warning device comprising:
 a housing;
 a plurality of concentrically arranged annular chambers defined by walls within said housing;
 means for heating the interior of each of said chambers to a predetermined temperature to maintain the interior of each chamber when in a closed condition at a predetermined pressure greater than ambient;
 means for exposing the exterior of the outermost of said chambers to ambient pressure;
 a door, pivotably connected to a wall of each of said chambers, each said door having a different surface area and being responsive to varying pressure differentials,
 means normally urging said door inwardly to maintain the corresponding chamber in the closed condition, said door being adapted to pivoting open in response to a predetermined pressure differential between interior and exterior pressure in said chamber; and
 signal means actuated by opening of each said door to indicate said predetermined pressure differential.

6. A storm warning device comprising:
 a housing;
 a plurality of concentrically arranged annular chambers defined by walls within said housing;
 means for heating the interior of each of said chambers to a predetermined temperature to maintain the interior of each chamber when in a closed condition at a predetermined pressure greater than ambient;
 means for exposing the exterior of the outermost of said chambers to ambient pressure;
 a door, pivotably connected to a wall of each of said chambers, each said door having a different surface area and being responsive to varying pressure differentials, said door being pivotable to an open condition in response to a predetermined pressure differential between the interior and exterior pressure in said chamber which is sufficiently high when exerted upon the surface area of said door to bias said door outwardly;

means normally urging said door inwardly to maintain the corresponding chamber in the closed condition, said door being adapted to pivoting open in response to a predetermined pressure differential between interior and exterior pressure in said chamber; and signal means actuated by opening of each said door to indicate said predetermined pressure differential.

References Cited

UNITED STATES PATENTS

| | | | |
|---|---|---|---|
| 1,009,338 | 11/1911 | Perkins | 200—81.9 |
| 2,526,315 | 10/1950 | Allen et al. | 200—81 |

FOREIGN PATENTS

| | | |
|---|---|---|
| 26,820 | 10/1949 | Great Britain. |
| 45,264 | 4/1919 | Sweden. |

JAMES J. GILL, *Acting Primary Examiner.*

RICHARD C. QUEISSER, *Examiner.*

J. J. SMITH, *Assistant Examiner.*